| United States Patent [19] | [11] Patent Number: 4,942,192 |
| Yasuda et al. | [45] Date of Patent: Jul. 17, 1990 |

[54] RUBBER COMPOSITIONS FOR TIRES

[75] Inventors: Takuo Yasuda, Tokorozawa; Hitoshi Kondo, Higashimurayama; Yoshiaki Echigo, Uji; Tsuneyuki Ohsawa, Uji; Yoshiaki Maekawa, Uji, all of Japan

[73] Assignees: Bridgestone Corporation, Tokyo; Ltd. Unitika, Hyogo, both of Japan

[21] Appl. No.: 236,954

[22] Filed: Aug. 26, 1988

[30] Foreign Application Priority Data

Aug. 26, 1987 [JP] Japan ................ 62-210227

[51] Int. Cl.$^5$ ............................ C08L 7/00; C08L 9/00; C08L 9/06; C08L 61/06
[52] U.S. Cl. ........................................ 524/44; 524/45; 524/47; 524/55; 524/436; 525/57; 525/133; 525/145
[58] Field of Search ................ 524/401, 526, 436, 44, 524/45, 47, 55; 525/133, 134, 57

[56] References Cited

U.S. PATENT DOCUMENTS 4,539,365  9/1985  Rhee .................... 524/526
4,647,328  3/1987  Rhee .................... 525/132

FOREIGN PATENT DOCUMENTS 1260138  3/1961  France .
47-16084  6/1972  Japan .
57-30856  7/1982  Japan .

*Primary Examiner*—Allan M. Lieberman
*Attorney, Agent, or Firm*—Sughrue, Mion, Zinn, Macpeak & Seas

[57] ABSTRACT

A rubber composition for use in tire, particularly bead filler comprises 2~30 parts by weight of a particular modified novolak resin having a self-curability based on 100 parts by weight of rubber ingredient.

5 Claims, No Drawings

RUBBER COMPOSITIONS FOR TIRES

BACKGROUND OF THE INVENTION

1. Field of the Invention

This invention relates to a rubber composition suitable for use in tires, particularly bead filler, and more particularly to a rubber composition developing good rigidity and durability as a bead portion of the tire by compounding a novel modified novolak resin.

2. Related Art Statement

Heretofore, there have been made various investigations on the bead portion structure of the radial tire in order to develop the rigidity and durability required for the tire.

For instance, there is attempted the arrangement of a bead reinforcing layer in the bead portion for improving the running performances, durability and the like of the tire.

On the other hand, the arrangement of super-hard rubber in the bead portion for improving the running performances and the like are well-known from Japanese Utility Model Publication No. 47-16,084, French Patent No. 1,260,138, U.S. Pat. No. 4,067,373 and so on.

However, these conventional techniques do not provide satisfactory solution as mentioned later. In Japanese Patent Application Publication No. 57-30,856, therefore, there is proposed a rubber composition for bead filler obtained by compounding novolak type phenolic resin and hexamethylene tetramine (hereinafter referred to as hexamine) or hexamethoxymethyl melamine with natural rubber, polybutadiene rubber or the like together with carbon black. Moreover, Japanese Patent Application Publication No. 57-30,856 discloses the addition of novolak type modified phenolic resin, which is a resin modified with an oil such as rosin oil, tall oil, cashew nut oil, linseed oil, olein oil or the like; an aromatic hydrocarbon such as xylene or the like; or a rubber such as nitrile rubber or the like. This modified novolak resin is entirely different from the modified novolak resin defined in the invention as mentioned later.

In the aforementioned method of arranging the bead reinforcing layer in the bead portion, the number of tire building steps becomes larger, and the tire productivity is considerably poor.

Further, in the method of arranging the superhard rubber in the bead portion, it is hardly considered to give the durability required as the tire while sufficiently developing performances as a bead filler rubber under complicated inputs during the running of the tire.

In the technique disclosed in Japanese Patent Application Publication No. 57-30,856 for solving the above problems, the novolak resin is cured in rubber with a curing agent such as hexamine, hexamethoxymethyl melamine or the like, so that the curing efficiency is poor as compared with the ordinary resin molding based on the mixing of only resin and curing agent and consequently a great amount of unreacted resin remains in rubber. Therefore, in order to provide a hardness desired as a bead filler rubber, it is necessary to increase the amount of the resin compounded or to increase the amount of the curing agent.

However, when the amount of the resin to be compounded is increased, the amount of unreacted resin becomes naturally large. As a result, the unreacted resin degrades the mechanical properties of the resulting rubber composition, particularly fatigue life and creep properties as a mere foreign matter and also provides a large heat build-up to shorten the fracture life of the tire. On the other hand, when the amount of the curing agent is increased, in case of hexamine, the strength of polyester fiber cord usually and widely used as a reinforcing cord for a carcass ply adjoining to the bead filler is lowered due to amine degradation during the tire vulcanization or during the running of the tire, which particularly comes into problem when the tire is vulcanized at high temperature. In case of using hexamethoxymethyl melamine, there is not caused the lowering of strength of the polyester fiber cord, but there are still the same problems as in the presence of the unreacted resin because the curing efficiency is much lower as compared with the hexamine.

SUMMARY OF THE INVENTION

It is, therefore, an object of the invention to solve drawbacks when novolak resin and curing agent are compounded with the rubber composition, i.e. problems due to the presence of the unreacted resin such as deterioration of heat build-up and fatigue life as well as problem of amine degradation in the tire using polyester fiber cords and to provide a rubber composition for use in a bead filler producing no aforementioned problems while compounding the resin with the tire bead rubber composition.

The inventors have made studies for solving the above problems and found that the problems due to the unreacted resin and amine degradation can be solved by compounding a newly developed novolak resin having a self-curability with a rubber composition, and as a result the invention has been accomplished.

According to the invention, there is the provision of a rubber composition for a tire comprising 2~30 parts by weight of a modified novolak resin having a self curability based on 100 parts by weight of rubber ingredient selected from polyisoprene rubber inclusive of natural rubber, polybutadiene rubber, styrene-butadiene copolymer rubber and a blend thereof.

DESCRIPTION OF THE PREFERRED EMBODIMENTS

The modified novolak resin used in the invention is produced, for example, by the following method.

That is, a novolak resin and an aldehyde are reacted in an aqueous medium in the presence of an emulsion stabilizer and a basic catalyst.

The novolak resin used herein is a solid thermoplastic resin obtained by mixing a phenol or a modified phenol with an aldehyde in a mol ratio of phenol to aldehyde of not more than 1, reacting in the presence of an acidic catalyst such as oxalic acid, hydrochloric acid, sulfuric acid or the like, and subjecting the resulting product to a heating, dehydration and dephenolization and has a melting point (according to ring and ball method) of 70°~100° C. and a chemical structure represented by the following formula (I):

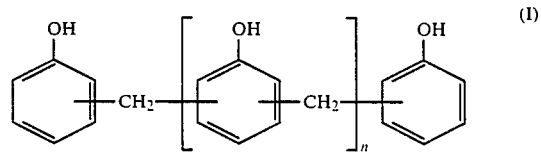

(wherein n is 2~6 and a position of methylene bond to phenolic nucleus is ortho or para site of the phenolic nucleus).

Such a novolak resin is easily available as an ordinary commercial product.

As the aldehyde used herein, mention may be made of formaldehyde, furfural and the like available in any form of formalin or paraformaldehyde. The amount of the aldehyde used to modify the novolak resin is within a range of 0.5~50 wt%, preferably 2~20 wt%.

When hexamine is used as a basic catalyst, formaldehyde is produced from hexamine in an aqueous medium. In this case, the use of the aldehyde may not be needed.

As the emulsion stabilizer, use may be made of inorganic salts substantially insoluble in water or water soluble organic high polymers.

The inorganic salts substantially insoluble in water include calcium fluoride, magnesium fluoride, strontium fluoride and the like, and the amount used to modify the novolak resin is preferable to be 0.2~10 wt%, preferably 0.5~3.5 wt%. In this case, the inorganic salt substantially insoluble in water may directly be added, or two or more water soluble inorganic salts capable of producing an inorganic salt substantially insoluble in water during the reaction may be added. For example, at least one water soluble inorganic salt selected from sodium fluoride, potassium fluoride and ammonium fluoride and at least one water soluble inorganic salt selected from chlorides, sulfates and nitrates of calcium, magnesium and strontium may be added instead of the fluorine compounds of calcium, magnesium and strontium to produce a fluorine compound of calcium, magnesium or strontium during the reaction.

When the inorganic salt such as calcium fluoride, magnesium fluoride, strontium fluoride or the like is used as the emulsion stabilizer, a part or whole of the surface of each phenolic resin particle is covered with such an inorganic salt, so that there is not observed the fusing between the particles and consequently particles having an excellent storage stability are obtained.

As the water soluble organic high polymer, use may be made of gum arabic, gutta-percha, hydroxylguayule rubber, partially hydrolyzed polyvinyl alcohol, hydroxyethyl cellulose, carboxymethyl cellulose, soluble starch, agar-agar and a mixture thereof, among which gum arabic is preferable. The amount of the water soluble high polymer used to modify the novolak resin is within a range of 0.2~10 wt%, preferably 0.5~3.5 wt%. Moreover, the water insoluble inorganic salt and the water soluble organic high polymer may simultaneously be used.

As the basic catalyst, use may be made of all basic catalysts usually used in the production of resol type phenolic resin, an example of which includes sodium hydroxide, potassium hydroxide, calcium hydroxide, magnesium hydroxide, ammonia water, hexamethylene tetramine, dimethylamine, diethylene triamine, polyethylene imine and a mixture thereof. The amount of the basic catalyst used to modify the novolak resin is within a range of 0.5~20 wt%, preferably 3~10 wt%.

The production of the modified novolak resin according to the invention is carried out in an aqueous medium. In this case, water is desirable to be charged in such a manner that the solid concentration of the novolak resin is within a range of 20~70 wt%, preferably 30~60 wt%.

This reaction is carried out under stirring at a reaction temperature of 70°~100° C., preferably 90°~98° C. Further, the reaction time is 5~90 minutes, preferably 10~20 minutes.

After the completion of the reaction, the reaction product is cooled below 40° C. and then subjected to a solid-liquid separation through filtration, centrifugal separation or the like.

The thus obtained product is washed and dried to obtain solid modified novolak resin particles having a particle size of not more than 1,000 μm.

Moreover, the production of such a resin may be performed by either of continuous process and batch process, but it is usually performed by the batch process.

According to the invention, the amount of the modified novolak resin compounded is within a range of 2~30 parts by weight based on 100 parts by weight of rubber ingredient.

When the amount of the modified novolak resin is less than 2 parts by weight, the addition effect or the improvement of rubber hardness for satisfying the performances required as a bead filler is not obtained, while when it exceeds 30 parts by weight, not only the kneading and extrusion operability of rubber but also the heat build-up are poor.

According to the invention, the rubber composition may contain additives usually used in rubber industry, such as sulfur, vulcanizing agent, vulcanization accelerator, antioxidant, carbon black, process oil and so on.

In the rubber composition according to the invention, micro particles of modified novolak resin previously polymerized in a separate step and having no fusing is compounded with rubber, so that the hardness, 25% modulus, dynamic modulus of elasticity and fatigue life are increased as compared with the rubber composition not containing such a modified novolak resin, such a rubber composition is suitable for use in the bead filler rubber of a tire.

Furthermore, the rubber composition according to the invention is large in the fracture strength, long in the fatigue life and causes no degradation of strength in polyester fiber cord due to the presence of amine as compared with the conventional technique of adding novolak resin and amine curing agent to rubber and polymerizing them in rubber. This is considered to be due to the fact that the unreacted resin, amine catalyst and the like are not existent in the rubber composition.

The following examples are given in illustration of the invention and are not intended as limitations thereof.

At first, there will be described examples of synthesis of the modified novolak resin used in the invention.

SYNTHESIS EXAMPLE 1

In to a glass flask of 1 l capacity were charged 200 g of novolak resin [#6000 made by Mitsui Toatsu Chemicals, Inc. (melting point: 70°~76° C.)], 20 g of 37 wt% formalin, 200 g of water, 8.4 g of calcium chloride and 5.8 g of calcium fluoride, and the resulting mixture was heated to 95° C. with stirring.

To the above mixture was added a solution of 10 g of hexamethylene tetramine separately dissolved in 100 g of water, and then the reaction was carried out by holding the liquid temperature at 95° C. for 10 minutes with stirring. Thereafter, the resulting mass was cooled to 30° C., added with 500 g of water, subjected to a solid-liquid separation through filtration with a filtering paper and washed with water to obtain resin particles. These resin particles were dried at 35° C. under a reduced pressure (not higher than 5 mmHg) for 24 hours to obtain modified novolak resin particles having an average particle size of about 100 μm, which was a resin A.

SYNTHESIS EXAMPLE 2

Into a glass flask of 1 l capacity were charged 200 g of novolak resin [#6000 made by Mitsui Toatsu Chemicals, Inc. (melting point: 70°~76° C.)], 150 g of water and 4 g of gum arabic, which were heated to 95° C. with stirring. To this mixture was added a solution of 20 g of hexamethylene tetramine separately dissolved in 150 g of water, and then the reaction was carried out by holding the liquid temperature at 95° C. for 15 minutes with stirring.

Then, the resulting mass was cooled to 30° C., added with 500 g of water, subjected to a solid-liquid separation through filtration with a filtering paper and then washed with water to obtain resin particles. These resin particles were dried at 35° C. under a reduced pressure (not higher than 5 mmHg) for 24 hours to obtain modified novolak resin particles having an average particle size of about 200 μm, which was a resin B.

SYNTHESIS EXAMPLE 3

The same procedure as in Synthesis Example 2 was repeated except that novolak resin of 3,000 P made by Mitsui Toatsu Chemicals, Inc. (melting point: 75°~90° C.) was used instead of the novolak resin used in Synthesis Example 2 to obtain modified novolak resin particles having an average particle size of about 250 μm, which was a resin C.

EXAMPLES 1~11, COMPARATIVE EXAMPLES 1~4

Various rubber compositions were prepared according to a compounding recipe shown in the following Table 1, and then the hardness, fracture strength, 25% modulus, dynamic modulus of elasticity, dynamic loss factor (tan δ), fatigue life and influence upon polyester fiber cord were evaluated with respect to these rubber compositions to obtain results as shown in Table 1.

Moreover, the evaluation was as follows:

(1) Hardness, Fracture strength, 25% modulus

They were measured according to methods of JIS K6301.

(2) Dynamic modulus of elasticity, Dynamic loss factor (tan δ)

They were measured at room temperature by using a viscoelastic spectrometer (VES-F type) made by Iwamoto Seisakusho under conditions of using a specimen of 2 mm in thickness, 4.7 mm in width and 20 mm in length, a strain of 1% and a frequency of 50 Hz.

(3) Fatigue life

A specimen of JIS-3 type having a thickness of 2 mm was subjected to repetitive fatigue under conditions of using an initial static load of 30 kg/cm$^2$, a dynamic repeating load of 20 kg/cm$^2$ and an atmosphere temperature of 27° C. by means of a repeating fatigue tester made by Samu Denshi Kikai K. K., from which was measured the repeating number until the specimen was broken.

(4) Influence upon polyester fiber cord

After polyester fiber cords were embedded into rubber and vulcanized under conditions of 160° C.×90 minutes, the cords were taken out and the cord strength thereof was measured, from which retention of strength to original cord strength was determined.

TABLE 1

| | Comparative Example | | Example | | | | | | | | | | | Comparative Example | |
|---|---|---|---|---|---|---|---|---|---|---|---|---|---|---|---|
| | 1 | 2 | 1 | 2 | 3 | 4 | 5 | 6 | 7 | 8 | 9 | 10 | 11 | 3 | 4 |
| natural rubber | 100 | 100 | 100 | 100 | 100 | 100 | 100 | 100 | 80 | 60 | 80 | 60 | 80 | 80 | 100 |
| SBR1500 | | | | | | | | | 20 | 40 | | | | 20 | |
| BR01 | | | | | | | | | | | 20 | 40 | | 20 | |
| carbon black HAF | 70 | 70 | 70 | 70 | 70 | 70 | 70 | 70 | 70 | 70 | 70 | 70 | 80 | 70 | 70 |
| process oil | 5 | 5 | 5 | 5 | 5 | 5 | 5 | 5 | 5 | 5 | 5 | 5 | 5 | 5 | 5 |
| stearic acid | 2 | 2 | 2 | 2 | 2 | 2 | 2 | 2 | 2 | 2 | 2 | 2 | 2 | 2 | 2 |
| zinc white | 6 | 6 | 6 | 6 | 6 | 6 | 6 | 6 | 6 | 6 | 6 | 6 | 6 | 6 | 6 |
| antioxidant (Nocrac 6C*) | 1 | 1 | 1 | 1 | 1 | 1 | 1 | 1 | 1 | 1 | 1 | 1 | 1 | 1 | 1 |
| vulcanization accelerator (Nocceler MSA*) | 1 | 1 | 1 | 1 | 1 | 1 | 1 | 1 | 1 | 1 | 1 | 1 | 1 | 1 | 1 |
| sulfur | 4 | 4 | 4 | 4 | 4 | 4 | 4 | 4 | 4 | 4 | 4 | 4 | 4 | 4 | 4 |
| resin A | | | 10 | 20 | | | | | 10 | 10 | 10 | 10 | 10 | | |
| resin B | | | | | 10 | 20 | | | | | | | | | |
| resin C | | | | | | | 10 | 20 | | | | | | | |
| conventional novolak resin | 15 | 15 | | | | | | | | | | | | | |
| resol resin | | | | | | | | | | | | | | 10 | |
| hexamethylene tetramine | 2 | 4 | | | | | | | | | | | | | |
| hardness | 93 | 94 | 91 | 96 | 92 | 96 | 89 | 94 | 93 | 95 | 93 | 94 | 96 | 88 | 81 |
| fracture strength (kg/cm$^2$) | 129 | 125 | 151 | 142 | 142 | 135 | 162 | 153 | 141 | 139 | 138 | 125 | 123 | 177 | 193 |
| 25% modulus (kg/cm$^2$) | 43 | 44 | 38 | 51 | 40 | 53 | 32 | 43 | 47 | 52 | 39 | 49 | 54 | 24 | 25 |
| dynamic modulus of elasticity (× 10$^8$ dyne/cm$^2$) | 10.5 | 10.9 | 8.2 | 10.7 | 8.5 | 11.0 | 7.5 | 8.9 | 9.5 | 10.8 | 8.7 | 9.6 | 10.1 | 3.2 | 3.2 |
| tan δ | 0.228 | 0.215 | 0.229 | 0.232 | 0.227 | 0.231 | 0.235 | 0.237 | 0.259 | 0.272 | 0.220 | 0.211 | 0.266 | 0.320 | 0.312 |
| fatique life (× 10$^4$ times) | 5.6 | 5.5 | 28.7 | 27.6 | 29.0 | 28.1 | 25.3 | 23.2 | 24.9 | 20.2 | 22.3 | 19.6 | 27.5 | 7.6 | 8.1 |
| retention of strength of polyester cord (%) | 72 | 38 | 95 | 91 | 95 | 92 | 95 | 92 | 94 | 94 | 93 | 94 | 95 | 97 | 100 |

*trade name of Ohuchi Shinko Kagaku K. K.

As seen from Table 1, the hardness, 25% modulus, dynamic modulus of elasticity and fatigue life are clearly improved in the examples according to the invention as compared with Comparative Example 4 containing no novolak resin. This tendency applies in comparison with Comparative Example 3 containing resol resin instead of novolak resin.

Furthermore, the fracture strength, fatigue life and retention of strength of polyester fiber cord are clearly improved in the invention as compared with Comparative Examples 1 and 2 compounding the conventional novolak resin and hexamethylene tetramine with rubber. The other properties are maintained at a level equal to that of the conventional technique.

As mentioned above, the rubber composition containing the particular modified novolak resin according to the invention largely improves the degradation of polyester fiber cord due to amine as compared with the conventional rubber composition obtained by polymerizing novolak resin in rubber in the presence of the amine catalyst and also considerably improves the fatigue life and the fracture strength. Furthermore, the hardness is high as compared with the rubber composition containing no novolak resin, and also the dynamic modulus of elasticity and the fatigue life are largely improved. Therefore, when the rubber composition according to the invention is used as a bead filler rubber, the very excellent effect is developed, and the cornering stability and durability of the tire are considerably improved. That is, the invention is very large in the contribution to practical use in tire industry.

What is claimed is:

1. A rubber composition for a tire comprising 2~30 parts by weight of a modified novolak resin having self-curability based on 100 parts by weight of rubber ingredient selected from the group consisting of polyisoprene rubber inclusive of natural rubber, polybutadiene rubber, styrene-butadiene copolymer rubber and a blend thereof, wherein said modified novolak resin is obtained by reacting a novolak resin represented by formula (I):

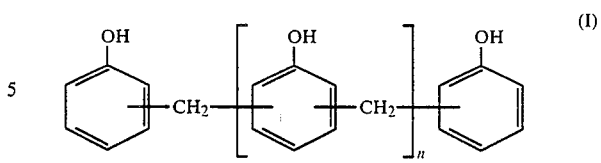

wherein n is 2~6 and a position of methylene bond to phenolic nucleus is an ortho or para site of the phenolic nucleus, with 0.5 to 50 weight % of an aldehyde in an aqueous stabilizer and 0.5 to 20 weight % of a basic catalyst.

2. The rubber composition according to claim 1, wherein said emulsion stabilizer is an inorganic salt substantially insoluble in water or a water soluble organic high polymer.

3. The rubber composition according to claim 2, wherein said inorganic salt is at least one of calcium fluoride, magnesium fluoride and strontium fluoride.

4. The rubber composition according to claim 2, wherein said organic high polymer is at least one of gum arabic, gutta-percha, hydroxyguayule rubber, partially hydrolyzed polyvinyl alcohol, hydroxyethylcellulose, carboxymethyl cellulose, soluble starch and agar-agar.

5. The rubber composition according to claim 1, wherein said basic catalyst is ammonia water hexamethylene tetramine or a mixture thereof.

* * * * *